Oct. 26, 1954     T. PRIMICH     2,692,417
SHEET METAL PIPE CONNECTOR
Filed Aug. 13, 1952     2 Sheets-Sheet 1
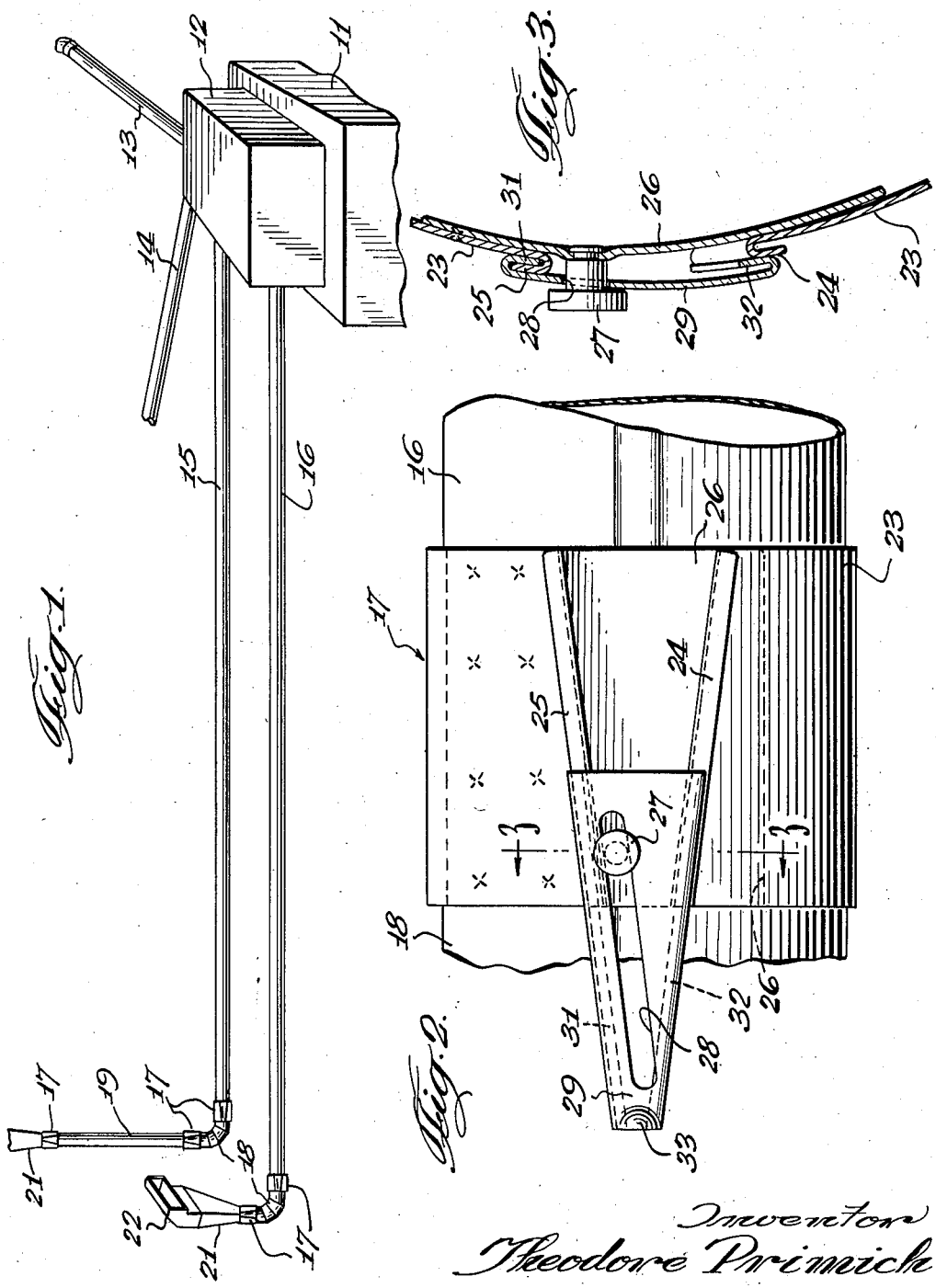
Inventor
Theodore Primich
By Alois W. Graf Attorney Oct. 26, 1954 T. PRIMICH 2,692,417
SHEET METAL PIPE CONNECTOR
Filed Aug. 13, 1952 2 Sheets-Sheet 2
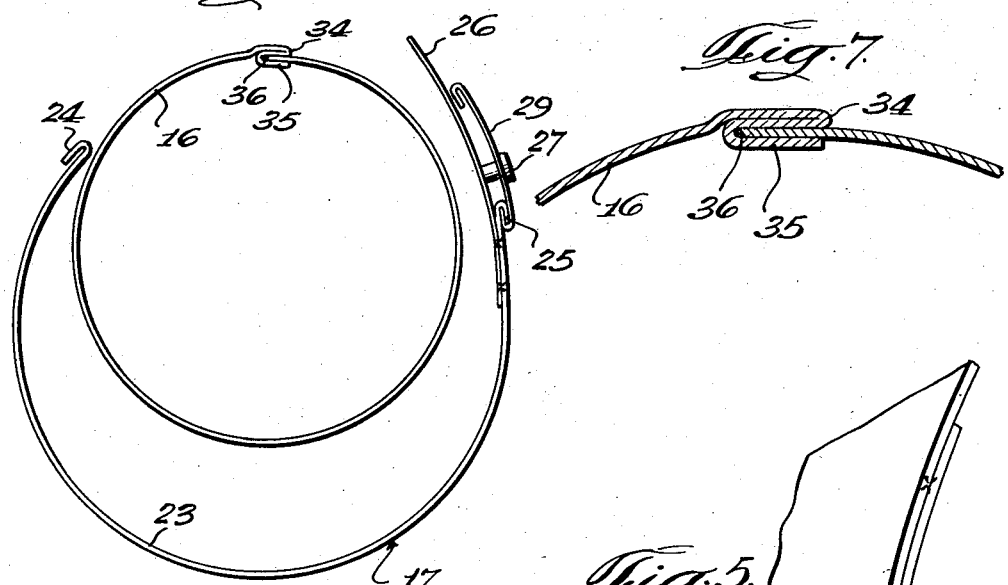
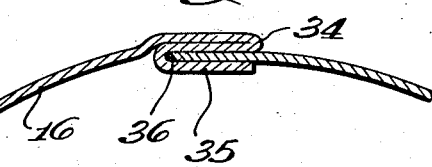
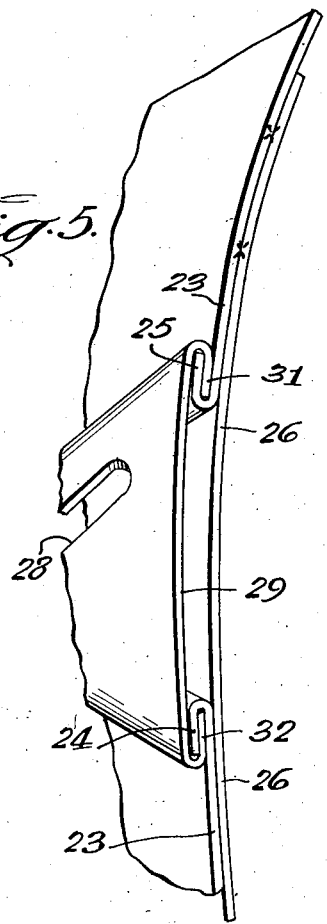
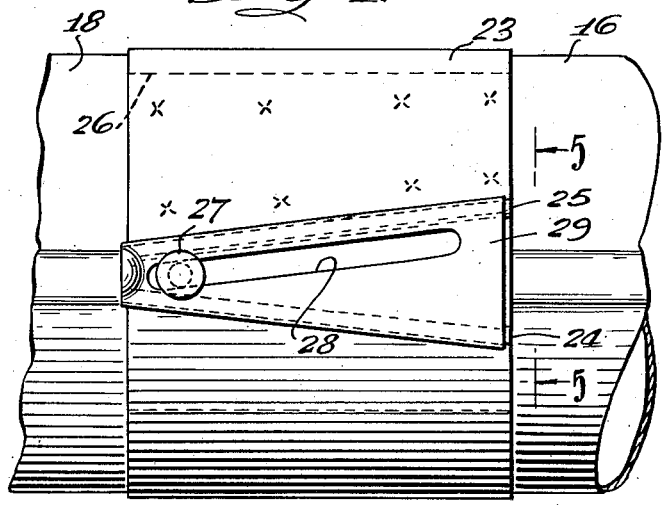
Inventor
Theodore Primich
By Alois W. Graf, attorney Patented Oct. 26, 1954

2,692,417

UNITED STATES PATENT OFFICE 2,692,417

SHEET METAL PIPE CONNECTOR

Theodore Primich, Gary, Ind.

Application August 13, 1952, Serial No. 304,165

2 Claims. (Cl. 24—268)

1

The present invention relates to a sheet metal pipe connector, and more particularly to an improved connector for use in warm air heating systems.

With the advent of perimeter heating there has been a definite trend toward the use of smaller pipes and a plurality of runs to a room rather than one large pipe. One of the advantages of perimeter heating with small pipes is the simplification of the return air system. In the use of smaller pipes it has been found, however, that the customary short lengths of pipe having crimped ends will reduce the flow of air from ten to twenty percent.

In order to obviate the effect of crimped ends in pipe it has been proposed to use butt joints and for this purpose draw clamps have been employed. Draw clamps use a plurality of bolts and nuts which frequently are inconvenient to install. Even where there are no obstructions to the installation of such draw clamps it has been found that it requires on the average of five minutes to make an installation. In the average home the use of butt joints now requires an average of sixty clamps, and hence a great deal of time is consumed in their installation. Of course, where the clamps are located in places of limited accessibility the time consumed in their installation is still greater. The close quarters in which some clamps are placed necessitates making them so that the bolt and nut project downwardly into the space, which creates a hazard where the floor is low, or, in other words where the basement ceiling is relatively low.

It, therefore, becomes apparent that it would be desirable to reduce the time of installation. In accordance with the present invention this is accomplished by employing ten feet lengths of pipe as contrasted to the usual twenty-six inch pipe lengths, and the use of a simplified connector in place of the more conventional draw clamps. This connector has the advantage of not requiring any alignment of holes for the placement of bolts and further does not have any projecting portions which might create a hazard.

It is, therefore, an object of the present invention to provide a simplified connector for warm air heating pipes.

A further object of the invention is to provide a simplified connector for warm air heating pipes which will substantially eliminate any protruding projections.

Still another object of the invention is to provide a simplified pipe connector which will eliminate the necessity for aligning holes for bolts.

2

A still further object of the invention is to provide an improved connector for warm air heating pipes which is rapidly installed by snapping the connector into position and actuating a simple fastening device which draws the connector tightly about the butt ends of two sheet metal pipe sections.

Other and further objects of the invention subsequently will become apparent by reference to the following description taken in conjunction with the accompanying drawing wherein:

Figure 1 is a perspective view of a partial installation of a heating system employing the present invention;

Figure 2 is a plan view of a coupling device comprising the present invention as it is being applied to two pipe sections;

Figure 3 is a cross-sectional view through the connector shown in Figure 2 as seen in the direction of the arrows along the line 3—3;

Figure 4 is a plan view of the coupling of Figure 2 when the installation has been completed;

Figure 5 is a perspective view as seen in the direction of the arrows along the line 5—5 of Figure 4;

Figure 6 is a cross-sectional view illustrating the first step in the installation of the coupling or connector comprising the present invention; and Figure 7 is a cross-sectional view of a portion of the pipe shown in Figure 6 illustrating the joint thereof.

Referring to Figure 1 of the drawing there is illustrated the upper portion of a furnace 11 having a plenum 12 which has a plurality of distributing pipes 13, 14, 15 and 16. In the preferred form the pipes such as 15 and 16 have a diameter of about four and one-half inches and a length of ten feet. In the plenum 12 these pipes are connected to a suitable collar by a connector or coupling similar to that shown at 17 where the pipes 15 and 16 are connected to elbows 18 and the elbows in turn are connected to another pipe 19 or to take-offs 21. The take-offs may terminate in a register opening 22.

Each coupling or connector comprising the present invention comprises an isosceles trapezoid sheet metal member 23 having its non-parallel edges 24 and 25 bent over to the exterior. Suitably attached by spot welding is an underlap member 26 which is of sufficient length so as to extend underneath the folded over end 24 prior to the time that it assumes the position shown in Figure 2. The underlap member 26 carries a headed rivet 27 which fits into an elongated slot 28 in an isosceles trapezoid fastening member 29. The non-parallel edges 31 and 32 of the isosceles trapezoid member 29 are turned over inwardly to engage the folded over edges 24 and 25 of the member 23. The folded over edge 31 is always in engagement with the folded over edge 25 because of the action of the rivet 27 and the slot 28. At the smaller end of the member 29 there is provided a dimpled portion 33 so that the end may readily be engaged by a metal member such as a screw driver which may be tapped or given a suitable blow to cause the fastening device 29 to move toward the right after the folded over edge 32 has snapped over the edge 24 of the member 23.

It will be noted from Figure 6 that the coupling or connector 17 may be split so as to readily be passed about a pipe 16. The end of the member 26 is brought under the end 24 of the member 23 until it is in the position shown in Figure 2. Thereafter a little further pressure causes the folded over edges 32 and 24 to interlock and assume a position similar to the folded over edges 25 and 31 on the other side of the fastening member 29. Force supplied to the dimpled portion 33, therefore, moves the fastening member 29 toward the right until the connector or coupling 17 is in secure engagement with the pipe 16 and the elbow 18 so as to hold them in alignment and in abutment with each other. Movement of the fastening member 29 toward the right draws the non-parallel folded over edges 24 and 25 of the member 23 closer together. The relationship of these members in the completely installed arrangement is readily seen in Figure 5.

One of the functions of the coupling or connector device 17 is also to hold the seam of the pipe 16 together. Since the use of ten foot sections of pipe is contemplated in accordance with the present invention the seam of the pipe is not clinched or riveted together as has been customary in the past. The pipe 16 has a seam which comprises a folded over portion best shown in Figure 7. It will be seen that one edge of the pipe 16 is reversely folded at 34 so that the two surfaces abut each other and again folded back at 35 to leave just sufficient space for the edge portion 36 to fit therein. The use of the connector or coupling member 17 provides a joint which is sufficiently tight without further clinching or pressing together of the member 35 toward the edge 36 or the folded over portion 34. It is believed that it will be apparent to those skilled in the art that the present invention greatly reduces the time of installation since there is no necessity of accurate alignment of the two ends of the member 23 in order to engage a fastening member such as a bolt and nut. The snap action of the present device facilitates the installation so that subsequent minor adjustment to align the edge of the underlap member 26 with the member 23 is readily accomplished without delay. The fastening member 29 does not project any appreciable distance beyond the pipe 16. Consequently no hazardous projections occur in an installation of this kind. The convenient way in which the coupling or connector may be slipped about the pipe 16 as shown in Figure 6 illustrates how time may be saved where the butt joints of two pipes or a pipe and an elbow or other components are in a comparatively inaccessible place.

While for the purpose of illustrating and describing the present invention a particular embodiment has been shown in the drawing, it is to be understood that such variations thereof are contemplated as may be commensurate with the spirit and scope of the invention set forth in the accompanying claims.

I claim as my invention:

1. A unitary coupling for holding in end to end abutment two sheet metal pipe sections comprising a sheet metal member of isosceles trapezoidal shape having its non-parallel edges folded over, the parallel edges of said member forming arcuate portions of circles with said folded over edges exterior thereof, said member being adapted to overlie end portions of two abutting pipe sections, a second sheet metal member attached to the inner side of said first metal member adjacent one end thereof so as to underlie both ends and said non-parallel edges, a fastening member for drawing said folded edges toward each other comprising an isosceles trapezoidal member having its non-parallel edges folded over, said latter member having one non-parallel edge parallel to the non-parallel edge of said first member when the other non-parallel edges of both said members are in alignment, a slot extending parallel to the edge of said fastening member which is parallel to the non-parallel edge of said first member and in partial engagement therewith, the shorter parallel edge of said fastening member being dimpled outwardly to present a convenient striking surface, and means on said second sheet metal member projecting upwardly through said slot to guide and retain in position said fastening member.

2. A unitary coupling for holding in end to end abutment two sheet metal pipe sections comprising a sheet metal member of trapezoidal shape having its non-parallel edges folded over, said member being shaped so its parallel edges form arcuate portions of circles with said folded over edges exterior thereof, said member being adapted to overlie end portions of two abutting sheet metal pipe sections, a second sheet metal member having one end attached to the inner side of said first member adjacent one end thereof so as to underlie both said non-parallel edges and to extend between said parallel edges, a movable fastening member for drawing together said folded over edges comprising a trapezoidal member having its non-parallel edges folded under for engagement with said folded over non-parallel edges of said first member, a slot extending substantially the length thereof and parallel to one of said non-parallel edges of said fastening member, said non-parallel edge adjacent said slot being in engagement with at least a portion of the non-parallel edge of said first sheet metal member which end of said member is attached to said second sheet metal member, and a headed stud secured to said second member and projecting through said slot to retain in position said movable fastening member.

References Cited in the file of this patent

UNITED STATES PATENTS

| Number | Name | Date |
|---|---|---|
| 1,474,822 | Hauf | Nov. 20, 1923 |

FOREIGN PATENTS

| Number | Country | Date |
|---|---|---|
| 548,868 | Germany | Apr. 20, 1932 |